United States Patent
Trumbull (10) Patent No.: US 11,223,818 B2
(45) Date of Patent: Jan. 11, 2022

(54) METHOD AND APPARATUS FOR PHOTOGRAPHING AND PROJECTING MOVING IMAGES IN THREE DIMENSIONS

(71) Applicant: Magi International LLC, Southfield, MA (US)

(72) Inventor: Douglas Trumbull, Southfield, MA (US)

(73) Assignee: Magi International LLC, Southfield, MA (US)

( * ) Notice: Subject to any disclaimer, the term of this patent is extended or adjusted under 35 U.S.C. 154(b) by 0 days.

(21) Appl. No.: 16/828,077

(22) Filed: Mar. 24, 2020

(65) Prior Publication Data

US 2021/0051313 A1 Feb. 18, 2021

Related U.S. Application Data

(63) Continuation of application No. 16/425,177, filed on May 29, 2019, now abandoned, which is a
(Continued)

(51) Int. Cl.
*H04N 13/296* (2018.01)
*H04N 13/144* (2018.01)
(Continued)

(52) U.S. Cl.
CPC ......... *H04N 13/296* (2018.05); *H04N 13/144* (2018.05); *H04N 13/161* (2018.05);
(Continued)

(58) Field of Classification Search
CPC .. H04N 13/296; H04N 13/363; H04N 13/239; H04N 13/341; H04N 13/144; H04N 13/161
See application file for complete search history.

(56) References Cited

U.S. PATENT DOCUMENTS

| 3,687,530 A | 8/1972 | Watanuki |
| 3,695,751 A | 10/1972 | Watanuki |

(Continued)

FOREIGN PATENT DOCUMENTS

| WO | 2001/006894 | 2/2001 |
| WO | 2011/078883 | 6/2011 |
| WO | 2018/009799 | 1/2018 |

OTHER PUBLICATIONS

McAllister, Display Technology: Stereo & 3D Display Technologies, Department of Computer Science, North Carolina State University, published Jan. 15, 2002, 50 pages.
(Continued)

*Primary Examiner* — James M Pontius
*Assistant Examiner* — Tyler B Edwards
(74) *Attorney, Agent, or Firm* — Finch & Maloney PLLC (57) ABSTRACT

A digital cinematographic and projection process that provides 3D stereoscopic imagery that is not adversely affected by the standard frame rate of 24 frames per second, as is the convention in the motion picture industry worldwide. A method for photographing and projecting moving images in three dimensions includes recording a moving image with a first and a second camera simultaneously and interleaving a plurality of frames recorded by the first camera with a plurality of frames recorded by the second camera. The step of interleaving includes retaining odd numbered frames recorded by the first camera and deleting the even numbered frames, retaining even numbered frames recorded by the second camera and deleting the odd numbered frames, and creating an image sequence by alternating the retained images from the first and second camera.

19 Claims, 3 Drawing Sheets

Related U.S. Application Data continuation of application No. 15/812,173, filed on Nov. 14, 2017, now abandoned, which is a continuation of application No. 14/955,979, filed on Dec. 1, 2015, now Pat. No. 9,848,182, which is a continuation-in-part of application No. 13/509,063, filed as application No. PCT/US2010/003251 on Dec. 23, 2010, now Pat. No. 9,204,132.

(60) Provisional application No. 61/290,050, filed on Dec. 24, 2009.

(51) Int. Cl.
*H04N 13/161* (2018.01)
*H04N 13/341* (2018.01)
*H04N 13/363* (2018.01)
*H04N 13/239* (2018.01)

(52) U.S. Cl.
CPC ......... *H04N 13/239* (2018.05); *H04N 13/341* (2018.05); *H04N 13/363* (2018.05)

(56) References Cited

U.S. PATENT DOCUMENTS

| | | | |
|---|---|---|---|
| 4,022,522 A | | 5/1977 | Rain |
| 4,577,103 A * | | 3/1986 | Geary .................. G03B 39/00 250/316.1 |
| 4,656,506 A | | 4/1987 | Ritchey |
| 5,175,575 A | | 12/1992 | Gersuk |
| 5,376,980 A | | 12/1994 | Gersuk |
| 5,611,174 A | | 3/1997 | Hayashi |
| 5,638,208 A | | 6/1997 | Walker |
| 5,717,415 A * | | 2/1998 | Iue ..................... H04N 13/167 345/8 |
| 5,724,775 A | | 3/1998 | Zobel, Jr. et al. |
| 6,501,599 B1 | | 12/2002 | Randolph |
| 6,665,985 B1 | | 12/2003 | Hennes |
| 6,793,350 B1 | | 9/2004 | Raskar |
| 6,874,889 B1 | | 4/2005 | Hill |
| 7,106,411 B2 | | 9/2006 | Read et al. |
| 7,295,244 B2 | | 11/2007 | Manico et al. |
| 7,573,475 B2 | | 8/2009 | Sullivan et al. |
| 8,259,162 B2 | | 9/2012 | Kim et al. |
| 8,358,332 B2 | | 1/2013 | Hendrickson et al. |
| 8,421,991 B2 | | 4/2013 | Read et al. |
| 8,955,258 B2 | | 2/2015 | Jacques et al. |
| 9,204,132 B2 * | | 12/2015 | Trumbull .......... H04N 13/296 |
| 9,371,179 B2 | | 6/2016 | Miller et al. |
| 9,848,182 B2 * | | 12/2017 | Trumbull .......... H04N 13/341 |
| 2002/0009137 A1 * | | 1/2002 | Nelson ............. H04N 13/167 375/240.1 |
| 2002/0196538 A1 | | 12/2002 | Lantz |
| 2003/0038925 A1 | | 2/2003 | Choi |
| 2003/0184674 A1 * | | 10/2003 | Manico ............. H04N 5/765 348/375 |
| 2004/0080822 A1 | | 4/2004 | Shafer |
| 2005/0014567 A1 | | 1/2005 | Li |
| 2005/0036645 A1 | | 2/2005 | Carver |
| 2005/0248726 A1 | | 11/2005 | Read et al. |
| 2006/0150530 A1 | | 7/2006 | Davey |
| 2006/0232582 A1 | | 10/2006 | Fannon |
| 2007/0146478 A1 | | 6/2007 | Butler-Smith et al. |
| 2007/0279415 A1 * | | 12/2007 | Sullivan ............. H04N 13/275 345/427 |
| 2009/0160934 A1 | | 6/2009 | Hendrickson et al. |
| 2009/0195640 A1 | | 8/2009 | Kim et al. |
| 2010/0300006 A1 | | 12/2010 | Magpuri |
| 2011/0116048 A1 | | 5/2011 | Read et al. |
| 2011/0279781 A1 | | 11/2011 | Wei et al. |
| 2012/0247030 A1 | | 10/2012 | Magpuri |
| 2012/0268570 A1 | | 10/2012 | Trumbull |
| 2013/0167452 A1 | | 7/2013 | Jacques et al. |
| 2014/0197168 A1 | | 7/2014 | Miller et al. |
| 2014/0230340 A1 | | 8/2014 | Fox |
| 2014/0232613 A1 | | 8/2014 | Fox |
| 2014/0235362 A1 | | 8/2014 | Fox |
| 2015/0146172 A1 | | 5/2015 | Maillard et al. |
| 2016/0088289 A1 | | 3/2016 | Trumbell |
| 2016/0227199 A1 | | 8/2016 | Gocke et al. |
| 2016/0333597 A1 | | 11/2016 | De Lespinois |
| 2019/0235623 A1 | | 8/2019 | Pollard |

OTHER PUBLICATIONS

International Search Report, received in PCT Application No. PCT/US2010/003251, dated Apr. 18, 2011, 3 pages.

International Preliminary Report on Patententability, received in PCT Application No. PCT/US2010/003251, dated Jun. 26, 2012, 6 pages.

Trumbull Studios, "The Magi Process", WISTIA video, https://trumbull.wistia.com/medias/wque2mkk41, https://trumbull.wistia.com/login?redirect_to=https%3A%2F%2Ftrumbull.wistia.com%2Fprojects, Jan. 2015.

Luczak et al., "Spatio-Temporal Scalability Using Modified MPEG-2 Predictive Video Coding", X European Signal Processing Conference, Eusipco 2000 CD-ROM Proceedings, vol. II, 16:30, Tampere, Finland, Sep. 4-8, 2000, 4 pages.

International Search Report and Written Opinion, received in PCT Application No. PCT/US2017/041102, dated Sep. 14, 2017, 24 pages.

International Preliminary Report on Patentability, received in PCT Application No. PCT/US2017/041102, dated Jan. 17, 2019, 12 pages.

International Search Report and Written Opinion, received in PCT Application No. PCT/US2019/051434, dated Nov. 29, 2019, 13 pages.

\* cited by examiner

METHOD AND APPARATUS FOR PHOTOGRAPHING AND PROJECTING MOVING IMAGES IN THREE DIMENSIONS

CROSS REFERENCE TO RELATED APPLICATIONS

This application is a continuation of U.S. patent application Ser. No. 16/425,177, filed on May 29, 2019, which is a continuation of U.S. patent application Ser. No. 15/812,173, filed on Nov. 14, 2017, which is a continuation of U.S. patent application Ser. No. 14/955,979, filed on Dec. 1, 2015, now U.S. Pat. No. 9,848,182, which is a continuation-in-part of U.S. patent application Ser. No. 13/509,063, now U.S. Pat. No. 9,204,132, filed on Jul. 6, 2012, which is a national stage application under 35 U.S.C. § 371 of PCT/US10/03251, filed on Dec. 23, 2010, which claims the benefit of U.S. Provisional Application Ser. No. 61/290,050, filed on Dec. 24, 2009, each of which is hereby incorporated by reference in its entirety.

TECHNICAL FIELD

Embodiments of the present disclosure relate to motion picture photography generally and, more particularly, to digital motion picture photography for projecting moving images in three dimensions.

BACKGROUND

Motion picture photography and projection is commonly accomplished via a series of still photographs on a strip of sprocketed celluloid film. In the camera, conventions of the motion picture industry call for a standardized frame rate of 24 frames per second (fps), most commonly photographed using a rotating shutter in the camera such that during 360 degrees of shutter rotation, half of the time ($1/48^{th}$ of a second) the shutter is open while the film is held fixed in the camera aperture, and the other half of the time the shutter is closed in order for a mechanical movement to transport the film to the next frame, utilizing the perforations on the film to register to either sprockets or claws to move the film as well as hold it in position during each exposure.

For projection, the same frame rate of 24 is used, however the shutter speed is doubled, so that each frame of film is shown twice before proceeding to the next frame. The shutter is often called a "butterfly", having two openings of 90 degrees each, and two closures of 90 degrees each, thus still rotating at 360 degrees per frame. During one of the shutter closures the film is advanced to the next frame using a mechanical Geneva mechanism, or sometimes a low inertia electric stepper motor. The reason for the double shuttering, which creates a 48 cycle-per-second rate, is to reduce objectionable perceived flicker of the image on the screen, which is limited in brightness to not more than 16 foot lamberts. Projection brighter than 16 foot lamberts reintroduces objectionable perceived flicker.

An objectionable artifact of this double-shuttering of each image frame is a substantial loss of motion continuity due to the fact that the image does not contain new motion position on each flash, resulting in a stroboscopic effect retained in the human retina. This loss of motion continuity is exacerbated in stereoscopic motion pictures, since frame-to-frame image displacement is often equal to, or more than, the left eye—right eye image separation needed for stereoscopic imagery.

With the advent of digital photography and digital projection, however, it is now possible to consider an alternative methodology of photographing and projecting a series of images in such a manner as to fully retain both temporal motion continuity, while also diminishing the objectionable artifacts of the 24-fps world standard.

It is common knowledge amongst cinematographers, directors, and editors that frame-to-frame object or image motion must be substantially limited in order to avoid objectionable blurring or strobing. Blurring results from object/image motion that occurs during the shutter opening of $1/48^{th}$ of a second. Strobing occurs when the image displacement from one frame to the next becomes so great that the eye cannot integrate the sequence of frames into a smooth motion. Screen size is considered a limitation, since frame-to-frame image displacement can become quite objectionable on large screens due to angular displacement of frames on fast action. IMAX is a good example of this phenomenon, and IMAX films routinely slow their camera and object motion in order to avoid objectionable blurring and strobing.

Another shortcoming of the 24-fps standard is that when projecting a 3D movie, which includes two simultaneous projections of left and right eye imagery, if the motion displacement or blur between frames exceeds the displacement between right and left eye convergence angles, the 3D effect is lost and is overcome by blurring and strobing of the image.

An earlier invention and patent for the Showscan system disclosed the photographing and projecting of motion pictures at sixty frames per second. See U.S. Pat. No. 4,477,160, incorporated herein by reference in its entirety. The Showscan system resulted in a solution for the above shortcomings of conventional film, while demonstrably increasing a sense of "liveness" and audience stimulation. Each frame was shown only once, thus not using a double-bladed shutter, and at a shutter opening of $120^{th}$ of a second, blurring of the recorded image was substantially reduced. At a projection rate of 60 frames per second, there was no apparent flicker at any increased screen brightness, and there was no discontinuity of motion. 3D films photographed and projected in Showscan had no objectionable object/image motion limitations that would adversely affect the 3D illusion.

Nevertheless, worldwide motion picture audiences are accustomed to the 24 frames per second standard, although the advent of 3D production and exhibition is revealing the shortcomings of the 24 fps standard, and since the film is attempting to create a more "immersive" experience for the viewer, it is now possible to consider a high frame rate solution that solves problems in both photography and projection. Accordingly, embodiments of the present disclosure are intended to take advantage of emerging digital technologies of electronic cinematography and digital projection, which no longer requires adherence to the world standard of 24 fps. In fact, the entire idea of "frames" as individual still photographs projected in rapid succession can now be revised to a new concept of overall fluid image flow by substantially increasing the number of frames per second. Since the photographed standard 24 fps film must be projected at a higher flash rate in order to avoid perceived flicker, and also solve the requirements for polarized stereoscopic projection, it is common to interleave alternating left and right eye frames via several alternating flashes.

For example, the RealD digital polarization technique alternately polarizes left and right eye images by sequentially flashing each frame as much as three times, resulting in a "flash rate" of 144 flashes (each frame being "shown" onto the screen three times). In this way a 24 fps film can be projected by a single digital projector. Since a new objective of "immersive stereoscopic imagery" is emerging, it is now possible to consider that each of the 144 flashes could actually be new frames of motion information, photographed at 144 frames per second. One of the major shortcomings of the present standards used when projecting 24 fps stereoscopic films is that the temporal information rate is unable to satisfy the need to reduce or eliminate blurring and strobing of the image that is quite objectionable when viewing the film stereoscopically. The advent of this invention is that by alternately photographing 72 left eye images interleaved with 72 right eye images, there remains perfect temporal continuity of the imagery.

In fact, filmmakers often desire to include in their films as much action as possible in order to instill a sense of participation and excitement in viewers, resulting in a sense of sensory immersion. Yet, a tremendous amount of this action is lost in blur if the frame rate is limited to 24 fps. And in 3D, at 24 fps the image may lose all sense of stereoscopic dimension due to both blur and strobing.

In view of the above, there is a need for a digital cinematographic and projection process that provides 3D stereoscopic imagery that is not adversely affected by the standard frame rate of 24 frames per second, as is the convention in the motion picture industry worldwide.

SUMMARY

In view of the foregoing, a method and apparatus for photographing and projecting moving images in three dimensions is disclosed.

A method and apparatus for photographing and projecting moving images in three dimensions with increased sharpness and clarity is also disclosed.

A method and apparatus for photographing and projecting moving images in three dimensions that results in extremely sharp and unblurred stereoscopic motion is also disclosed.

A method and apparatus for photographing and projecting moving images in three dimensions that removes and corrects objectionable artifacts of blurring, strobing, limited screen brightness, and loss of stereoscopy for 3D is also disclosed.

According to embodiments of the present disclosure, a method and apparatus for photographing and projecting moving images in three dimensions is provided. The method includes the steps of recording a moving image with a first and a second camera simultaneously and interleaving a plurality of frames recorded by the first camera with a plurality of frames recorded by the second camera. The step of interleaving includes retaining odd numbered frames recorded by the first camera and deleting the even numbered frames, retaining even numbered frames recorded by the second camera and deleting the odd numbered frames, and creating an image sequence by alternating the retained images from the first and second camera.

BRIEF DESCRIPTION OF THE DRAWINGS

Embodiments of the present disclosure will be better understood from reading the following description of non-limiting embodiments, with reference to the attached drawings, wherein below.

DETAILED DESCRIPTION

As alluded to above, embodiments of the present disclosure intend to correct object/image motion and blurring at the digital camera, by photographing a sequence of left eye and right eye images at the heretofore unheard of rate of 144 fps, thus delivering to viewers an accurate depiction of the actual motion that occurred at that moment. In digital projection, each frame is shown in its correct temporal sequence, while alternating between left eye and right eye flashes, thus resulting in each eye receiving 72 flashes per second, for a total of 144 fps. Existing digital projection systems already include 120 and 144 cycles-per-second flash rates, thus showing each of the 24 frames five or six times for 2D imagery, or two or three times for interleaved 3D alternating polarization. This eliminates flicker and makes possible substantially increased screen brightness, since the limiting factor of 16 foot lamberts at 48 flashes per second has been substantially exceeded.

In the short-term implementation of various embodiments, photography will occur at a predetermined frame rate that is considered more than adequate to capture clear and unblurred stereoscopic image information, preferably at around 120 or 144 frames per second. Alternatively, however, this could possibly be any new number of frames per second necessary to meet industry demands regarding data storage, compression, and distribution costs vs. image quality/impact issues.

An example of the above process would be to shoot at 144 frames per second with a shutter opening of 360 degrees, which is possible with certain digital cameras. In this way, each frame would have an exposure of almost exactly $\frac{1}{144}^{th}$ of a second, resulting in minimal blur on each frame as compared to shooting at 24 fps, with a shutter opening of $\frac{1}{48}^{th}$ of a second. By digitally alternating left and right eye frames in correct temporal succession, the resultant imagery would create a strong immersive experience.

Figure 1:
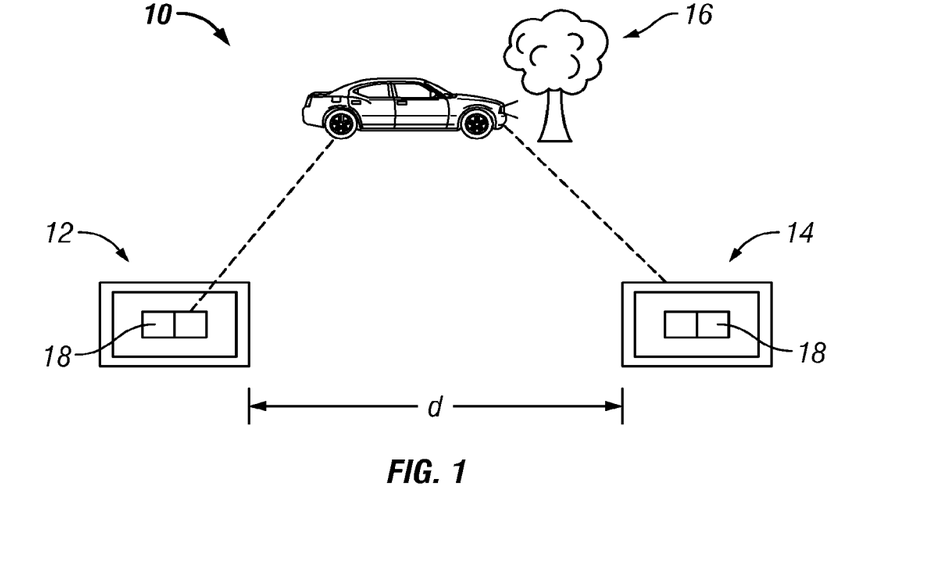
FIG. 1 illustrates an example apparatus for photographing and projecting moving images in three dimensions according to one embodiment of the present disclosure.
Figure 2:
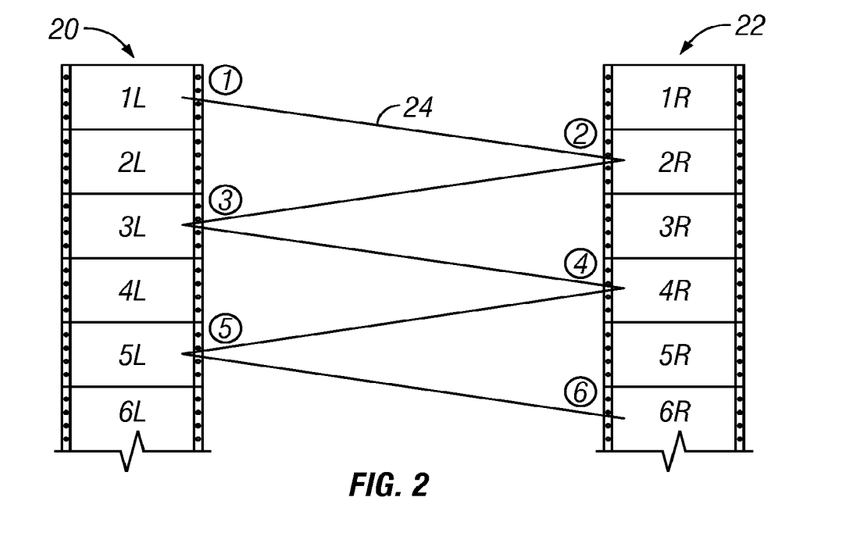
FIG. 2 illustrates example frames of images recorded on a pair of sprocketed film reels using the apparatus of FIG. 1, in accordance with an embodiment of the present disclosure.

Referring to FIG. 1, a first embodiment of the present disclosure is shown. As illustrated therein, a first iteration of the process would be to configure dual digital cameras, a first camera 12 and a second camera 14, side-by-side, with a lens center separation, d, similar to standard interocular spacing of approximately 2.25". Each camera would record synchronized imagery 16 at 144 frames per second, using a 360 degree shutter 18. This recorded synchronized imagery is shown in FIG. 2 wherein imagery from the first camera 12 is recorded on a first strip of film 20 and imagery from the second camera 14 is recorded on a second strip of film 22. Thus, by alternately interleaving frames 1, 3, 5, 7, 9 from the first camera 12 (deleting the even frames) with frames 2, 4, 6, 8 etc. (deleting the odd frames) from the second camera 14, a single data stream would therefore contain alternating stereo pairs of images that would be projected in correct temporal sequence, resulting in extremely fluid, non-blurred, and higher impact stereoscopic imagery that could then be projected via an alternating polarization system such as RealD's single projector electronically controlled polarization. The image sequence of interleaved frames, i.e., the data stream, is represented by the zigzag sequence line 24 in FIG. 2.

Figure 3:
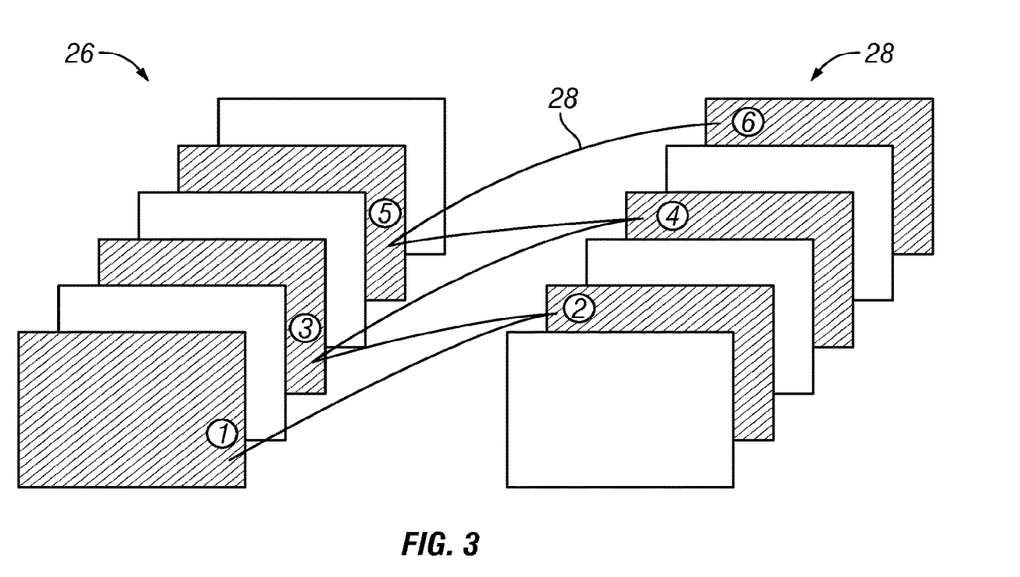
FIG. 3 illustrates example frames of images recorded digitally using the apparatus of FIG. 1, in accordance with an embodiment of the present disclosure.

Referring to FIG. 3, frames of images recorded digitally using the apparatus 10 of FIG. 1 are shown wherein the first set of frames 26 contain imagery recorded by the first camera 12 and the second set of frames 28 contain imagery recorded by the second camera 14. As discussed above, by alternately interleaving frames 1, 3, 5, 7, 9 from the first camera 12 (deleting the even frames) with frames 2, 4, 6, 8 etc. (deleting the odd frames) from the second camera 14, a single data stream would therefore contain alternating stereo pairs of images that would be projected in correct temporal sequence, resulting in extremely fluid, non-blurred, and higher impact stereoscopic imagery. The image sequence of interleaved frames, i.e., the data stream, is represented by the zigzag sequence line 30 in FIG. 2.

Figure 4:
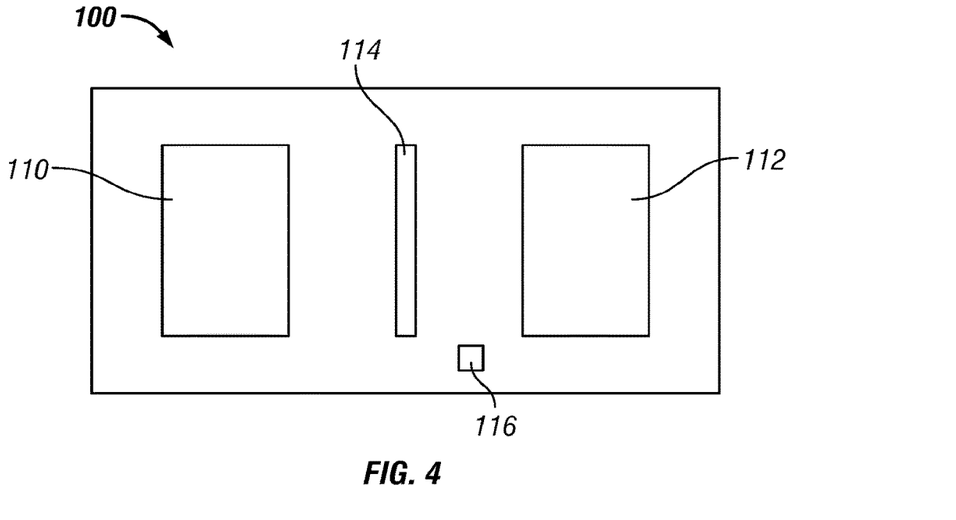
FIG. 4 illustrates an example apparatus for photographing and projecting moving images in three dimensions in accordance with another embodiment of the present disclosure.

Referring now to FIG. 4, an apparatus 100 according to a second embodiment of the present disclosure is shown. As shown therein, a second embodiment of the present disclosure includes the fabrication of a single digital camera technology that includes within it the appropriate left and right eye lenses 110, 112 and an alternating rotating mirror shutter 114 that would sequentially deliver left and right eye images to a single sensor 116 at 144 fps. Thus, the left and right eyes each receive interleaved stereoscopic streams of 72 fps each.

The most common digital projection systems today are using either the Texas Instruments Digital Light Processing chips (DLP) that use a matrix of micro mirrors to deliver imagery or the Sony SXRD liquid crystal on silicon (LCOS) technology. Such chips can switch states of the micro mirrors at up to 144 Hz. They use a frame buffer that retains 24 frame material, so each frame may be flashed six times for 2D, or in the event of 3D, alternates between left and right imagery, showing each frame for three alternating flashes. Embodiments of this disclosure anticipate the introduction of a new contiguous data stream, without a frame buffer, that can introduce new motion imagery on virtually every flash, thus resulting in extremely sharp and unblurred stereoscopic motion.

An additional anticipated aspect of this new technology involves issues related to potentially reduced signal to noise ratio, lowered bit depth, or other problems resulting from such brief exposures on a CCD or CMOS imager. However, trading off these issues with increased apparent sharpness and clarity (rather than blur) could more than make up for this. It is also possible to trade off resolution in exchange for motion continuity and clarity, for example reducing resolution from, say, 4K to 2K, while delivering less blurred stereoscopic imagery. The human eye may still prefer, and not notice, such a process since the overall experience is one of tremendously increased image information.

The expected result of various embodiments will be the advent of a digital motion picture standard that contains within it the desires of both filmmakers and cinema viewers to deliver the immersive experience that they expect of a 3D movie, but with all of the objectionable artifacts of blurring, strobing, limited screen brightness, and loss of stereoscopy for 3D removed and corrected. Various embodiments will facilitate the production of films with unlimited action potential, as well as unlimited screen size and brightness. Various embodiments anticipate the inclusion of motion/action that may exceed the 60 frames per second rate of Showscan, with fast action updated on every flash, rather than the objectionable double shuttering of film. Overall, various embodiments will result in an increased sense of audience excitement and stimulation, which is expected to be measurable via electromyogram, electroencephalogram, galvanic skin response, electrocardiogram, and possibly even Functional Magnetic Resonance Imaging.

Since 3D films must also be available to the marketplace in normal 2D as well as 24 fps standard for showing in normal cinemas and on television, it is an implicit intention of various embodiments to offer that (from either left or right eye image streams) groups of frames can be digitally merged into a single frame that would be indistinguishable from the same subject photographed at 24 fps, since the shutter was open 360 degrees. This is accomplished, in the case of 144 fps by combining three sequential frames into one, then deleting the next three sequential frames, thus resulting in 24 frames that would be identical to having been originally photographed with a 180 degree shutter. In the case of 120 fps, three sequential frames would be combined, and the following two sequential frames would be deleted, thus also resulting in 24 fps. If a filmmaker chose to use the iteration of various embodiments that use a single digital camera equipped with an alternating mirror shutter there could be objectionably uneven merging of frames, since there would no longer be the equivalent of a 360 degree shutter, but rather a 180 degree shutter. Nevertheless, it would be possible to use the 120 frame version of various embodiments, using only the (single eye) sequence of combining frames 1 and 3, while deleting frame 5, thus resulting again in 24 fps.

Stereoscopic imagery is typically made up of a stereo pair of images photographed simultaneously using 180 degree shutters running at, for example, 24 frames per second. In this manner, each frame of both cameras is simultaneously exposed for $\frac{1}{48}^{th}$ of a second, which means that 50% of the action in the scene is lost forever between exposures because of the shutter closures. Some existing 3D projectors project alternating left and right frames three times for a total of 144 flashes per second. The triple flashes contain no motion because they are repeats of the same frame. Some other stereoscopy imagery is also made up of a stereo pair of images photographed simultaneously, however using 270 degree shutters running at 48 frames per second. In this manner, a portion of the action is still lost because the shutters were closed for 90 degrees. During projection, every left and right frame is shown two times for a total of 192 flashes per second. Yet another technique shoots the scene at 60 frames per second with a 180 degree shutter, and projects each left and right frame once for a total of 120 flashes per second. However, since the left and right frames are simultaneously recorded, again there is not perfect temporal continuity in the sequence.

In accordance with an embodiment, techniques are disclosed for presenting alternating left and right eye images using a temporal offset between images, such that a set of 60 frame per second images to each eye contain a total of 120 unique positions in time. By contrast with existing techniques, various embodiments of the present disclosure introduce a temporal cadence, so that left and right images contain different positions in time rather than simultaneous exposures of the scene, as with existing techniques. This new temporal cadence creates a unique illusion of realism when displayed at 120 frames per second.

In accordance with various embodiments, it is appreciated that perfect temporal continuity of alternating left and right eye images for stereoscopic display eliminates perceived motion artifacts that result from conventional methodology of photographing stereo pairs of images that are photographed simultaneously, but displayed consecutively. Existing Virtual Reality systems are designed based upon the assumption that a stereo pair of images are recorded or generated by a graphics engine simultaneously. Existing Virtual Reality systems may use various frame rates to smooth out motion artifacts. By contrast, embodiments of the present disclosure provide techniques for generating and delivering each of the left and right images of a stereo pair in an alternating sequence in time, which results in a superior sense of realism to the observer and improved realism resulting from an apparent doubling of the effective frame rate.

To this end, in accordance with an embodiment, a motion picture photographic and projection system is configured to photograph each left and right eye image of a stereoscopic pair in an alternating temporal sequence, with the 180 degree shutters of the left and right cameras being out of synchronization. For example, when the left camera shutter is open, the right camera shutter is closed, and vice versa, so that at any given instant in time either the left or the right shutter is open, matching the cadence of the projector, thus allowing a continuous temporal sequence of action to be recorded. This alternating temporal sequence can be the same temporal sequence at which the images can subsequently be displayed. For example, each alternating left and right image may be photographed at 60 images per second, resulting in a total of 120 motion images each photographed at different points in time. Alternately, both cameras with 360 degree shutters can be recording in synchronization, but alternate (odd and even) frames in the left and right sequence are discarded and not projected, while the other frames are flashed in a left-right sequence. These techniques, according to various embodiments, result in an unexpected illusion of reality, which is an important attribute for Virtual Reality systems. Furthermore, embodiments of the present disclosure provide the advantage of smoother motion, less blurring, and the ability to include much faster action, while reducing bandwidth of the image generation/display computer, in comparison to existing techniques. Embodiments of this disclosure may be readily included in a wide variety of Virtual Reality display systems, improving their performance and realism at lower cost.

Figure 5:
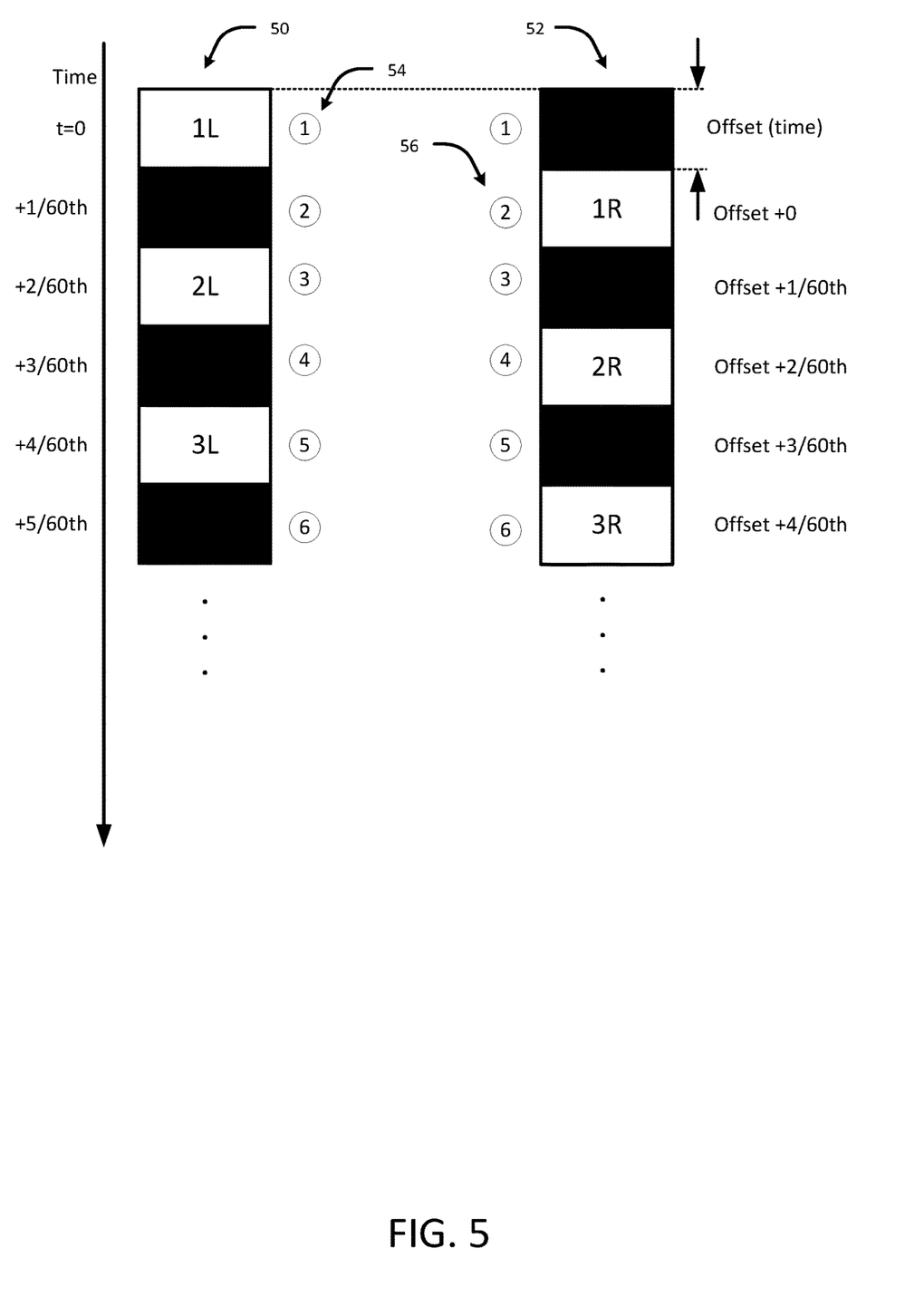
FIG. 5 illustrates example frames of images recorded on a pair of film strips using the apparatus of FIG. 1, in accordance with an embodiment of the present disclosure.

Referring again to FIG. 1, and according to another embodiment of the present disclosure, the dual digital cameras including the first camera 12 and the second camera 14 can be configured side-by-side, with a lens center separation, d, similar to standard interocular spacing of approximately 2.25". In this embodiment, each camera 12, 14 is configured to record non-synchronized imagery 16 at, for example, 60 frames per second, using a 180 degree shutter 18. In particular, each camera 12 and 14 is configured to record the imagery 16 using a temporal offset, such as shown in FIG. 5, where the second camera 14 records a frame (e.g., 1R) at some non-zero time after the first camera 14 records a frame (e.g., 1L). The frames (e.g., 1L and 1R) are recorded at different points in time, as indicated by the time offset. For instance, with a 180 degree shutter, the left camera shutter may be open while the right camera shutter is closed, and vice versa, so that at any given point in time one of the shutters is open. The offset may, for example, be $\frac{1}{60}^{th}$ of a second for a 60 frame-per-second recording speed (or 180 degrees of shutter cadence), although it will be understood that other recording speeds and offsets may be used. This recorded imagery is shown in FIG. 5, where imagery from the first camera 12 is recorded on a first strip of film 50 and imagery from the second camera 14 is recorded on a second strip of film 52. In this manner, each eye is off for half of the time and on for half of the time. Thus, by alternately recording frames 1L, 2L, 3L, and so on from the first camera 12 with frames 1R, 2R, 3R, and so on, from the second camera 14, each temporally offset from the corresponding frames recorded by the first camera 12, a data stream may therefore contain stereo pairs of images that can be projected in a correct temporal cadence (e.g., left-right-left-right, etc., each left image in strip 50 projected at 60 frames per second and each right image in strip 52 projected at 60 frames per second temporally offset from the left strip 50), resulting in extremely fluid, non-blurred, and higher impact stereoscopic imagery. Such imagery may be projected via an alternating polarization system such as RealD's single projector electronically controlled polarization, a liquid crystal display, a light emitting diode (LED), an organic LED (OLED), a laser scanner, or any other left/right Virtual Reality projection system. The recorded sequence of temporally offset frames, i.e., the data stream, is represented by the sequence 54 and 56 in FIG. 5. This recorded sequence can subsequently be projected at the same speed as it was recorded (e.g., 60 or 72 frames per second) and using the same time offset as it was recorded (e.g., $\frac{1}{60}^{th}$ of a second or other suitable interval), such that each of the projected left and right frames contain images of the scene 16 at different points in time (e.g., from time t=0, 0 seconds (left), $+\frac{1}{60}^{th}$ of a second (right), $+\frac{2}{60}^{th}$ (left), $\frac{3}{60}^{th}$ (right), etc.).

In some embodiments, the first and second cameras 12, 14 may be the same camera having dual sensors and lenses. In some embodiments, the cameras 12, 14 may include a rotating or liquid crystal shutter. In some embodiments, instead of a camera, the system may include a graphics generation device for artificially generating images rather than recording images of a scene. The graphics generation device can be configured to generate and project alternating left/right image frames in the manner described above (e.g., the device may render the left image, then the right image, then the left image, and so forth in sequence, projecting one image at a time to the observer, alternating between the left and right eyes). In this manner, the workload of the graphics generation device may be reduced, since only one frame is being rendered at any given point in time.

One example embodiment of the present disclosure includes a method for projecting moving images in three dimensions. The method includes receiving left eye frames of a moving image as recorded with a first camera lens having a first lens center and having been recorded at at least 60 frames per second and at left eye recordal times; receiving right eye frames of said moving image recorded with a second camera lens having a second lens center that is spaced apart from the first lens center and having been recorded at at least 60 frames per second and at right eye recordal times offset from the left eye recordal times; and projecting said moving image from a single projector in three dimensions by projecting the left eye frames one time each and the right eye frames one time each, the projecting of the left eye frames and the right eye frames occurring in an alternating sequence that projects the left eye frames as recorded at the left eye recordal time by said first camera lens and the right eye frames as recorded at the right eye recordal times by said second camera lens, each successive frame of the alternating sequence having been recorded at a successive time and projected temporally with respect to one another in the same time sequence to show the moving image. In some cases, said first and said second camera lenses have a lens separation of approximately 2.25 inches.

In some cases, the projecting occurs at a frame rate of 120 or more frames per second. In some cases, each successive frame of the sequence represents new motion of imagery. In some cases, the projecting said moving image includes digital projection of digital frames. In some cases, the projecting said moving image includes projecting said moving image onto a cinema screen from a single projector in three dimensions by flashing frames one time each in a sequence that alternates between left eye frames consisting of imagery recorded at the corresponding left eye recordal times by said first camera lens and right eye frames consisting of imagery recorded at the corresponding right eye recordal times by said second camera lens.

Although various embodiments have been shown and described with respect to the detailed embodiments thereof, it will be understood by those of skill in the art that various changes may be made and equivalents may be substituted for elements thereof without departing from the scope of the disclosure. In addition, modifications may be made to adapt a particular situation or material to the teachings of the disclosure without departing from the essential scope thereof. Therefore, it is intended that embodiments of the present disclosure not be limited to the particular embodiments disclosed in the above detailed description, but that the various embodiments will include all embodiments falling within the scope of this disclosure.

The invention claimed is:

1. A method for photographing and projecting moving images in three dimensions, comprising the steps of:
   receiving left eye image frames of a moving image recorded with a first digital camera;
   receiving right eye image frames of said moving image recorded with a second digital camera simultaneously with said first digital camera; and
   projecting, using a digital image projector, the left eye image frames one time each at a 50% duty cycle and the right eye image frames one time each at the 50% duty cycle, the projecting of the left eye frames and the right eye frames occurring in a projection sequence that illuminates the left eye frames and the right eye frames simultaneously, each successive left eye frame and right eye frame of the projection sequence having been recorded at a successive time and projected in temporal sequence to show the moving image.

2. The method for photographing and projecting moving images of claim 1, wherein the projecting comprises:
   retaining one of odd or even numbered frames recorded by said first camera;
   retaining the other of odd or even numbered frames recorded by said second camera; and
   creating an alternating projection sequence by alternating said retained images from said first and said second camera.

3. The method for photographing and projecting moving images of claim 2, further comprising:
   projecting the alternating projection sequence with an alternating polarization system.

4. The method for photographing and projecting moving images of claim 1, wherein:
   said first and said second camera have a lens separation of approximately 2.25 inches.

5. The method for photographing and projecting moving images of claim 1, wherein:
   the moving image is recorded at a frame rate of 120 or 144 frames per second.

6. The method for photographing and projecting moving images of claim 1, wherein:
   said recording is accomplished using a 360 degree shutter.

7. A method for photographing and projecting moving images in three dimensions, comprising the steps of:
   recording a moving image through a left eye lens of a camera;
   recording said moving image through a right eye lens of the camera simultaneously with the recording of the moving image through the left eye lens; and
   sequentially delivering left and right eye recorded images from said left eye lens and said right eye lens to a sensor in a sequence that delivers the left eye recorded images and the right eye recorded images to the sensor at a 50% duty cycle, each successive image of the projection sequence having been recorded at a successive time and projected in temporal sequence to show the moving image.

8. The method for photographing and projecting moving images of claim 7, wherein:
   said left and right eye recorded images are sequentially delivered to said sensor at 144 frames per second to produce interleaved left eye and right eye stereoscopic image streams of 72 frames per second each.

9. The method for photographing and projecting moving images of claim 7, further comprising:
   projecting said interleaved stereoscopic streams without a frame buffer.

10. The method for photographing and projecting moving images of claim 8, further comprising the step of:
    digitally merging a group of frames from one of said left eye stream or said right eye stream into a single frame.

11. The method for photographing and projecting moving images of claim 10, wherein said step of digitally merging further comprises:
    combining three sequential frames into a single frame; and
    deleting the next three sequential frames to produce 24 frames.

12. A method of projecting moving images in three dimensions, the method comprising:
    receiving left eye image frames of a moving image recorded with a digital camera;
    receiving right eye image frames of said moving image recorded with the digital camera; and
    projecting, using a digital image projector, said moving image from a single projector onto a cinema screen by flashing the left eye image frames one time each at a 50% duty cycle and flashing the right eye image frames one time each at the 50% duty cycle, the flashing of the left eye image frames and the right eye image frames occurring in a projection sequence that projects the left eye image frames and the right eye image frames simultaneously, each successive left eye frame and right eye frame of the projection sequence having been recorded at a successive time and projected in temporal sequence to show the moving image.

13. The method of projecting moving images of claim 12, wherein each successive frame of the projection sequence is projected at a frame rate of at least 120 frames per second.

14. The method of projecting moving images of claim 12, wherein the left eye image frames are projected at 60 frames per second, and wherein the right eye image frames are projected at 60 frames per second.

15. The method of projecting moving images of claim 12, wherein each successive frame of the projection sequence represents new motion of imagery.

16. The method of projecting moving images of claim 12, wherein the projecting said moving image includes projecting said moving image onto the cinema screen from the single projector by flashing frames one time each in a sequence that alternates between left eye image frames and right eye image frames consisting of imagery recorded simultaneously.

17. The method of projecting moving images of claim 12, wherein the left eye image frames are recorded with a first camera lens having a first lens center and the right eye image frames are recorded with a second camera lens having a second lens center that is spaced apart from the first lens center.

18. The method of projecting moving images of claim 12, comprising interleaving a plurality of digital dark frames into the projection sequence of a 48, 60, 72, 96, 120, or 144 frames per second (fps) image stream of a two-dimensional (2D) or three-dimensional (3D) movie.

19. The method of projecting moving images of claim 12, wherein, during projection, flashing of the left eye image frames by the digital image projector is out-of-phase with respect to flashing of the right eye image frames.

* * * * *